Sept. 25, 1934.  G. R. WOOD  1,974,940
SCALE
Filed March 16, 1931   4 Sheets-Sheet 1

INVENTOR
Geo. R. Wood
BY his ATTORNEY

Sept. 25, 1934.     G. R. WOOD     1,974,940
SCALE
Filed March 16, 1931     4 Sheets-Sheet 2

INVENTOR
Geo. R. Wood
BY his ATTORNEY

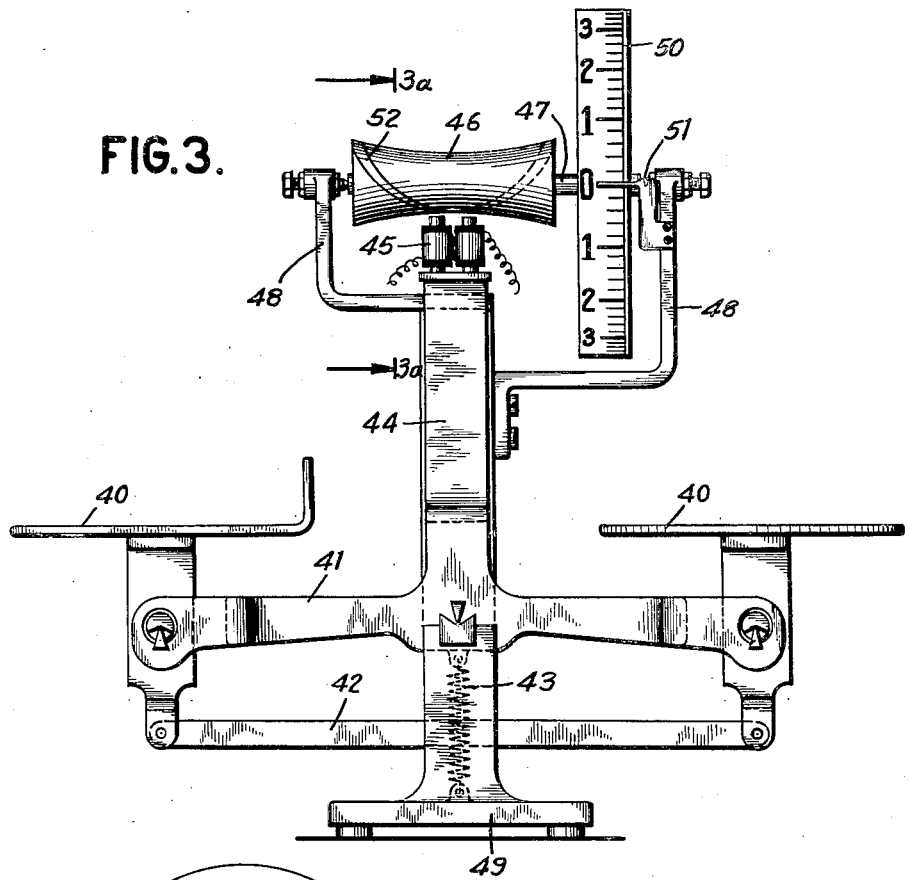
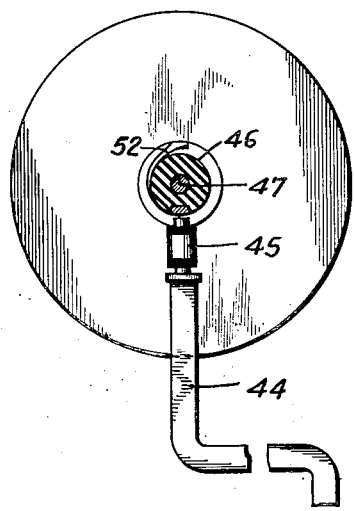

Sept. 25, 1934.     G. R. WOOD     1,974,940
SCALE
Filed March 16, 1931    4 Sheets-Sheet 4

INVENTOR
Geo. R. Wood
BY his ATTORNEY

Patented Sept. 25, 1934

1,974,940

UNITED STATES PATENT OFFICE 1,974,940

SCALE

George R. Wood, Toronto, Ontario, Canada, assignor, by mesne assignments, to International Business Machines Corporation, New York, N. Y., a corporation of New York Application March 16, 1931, Serial No. 522,888

4 Claims. (Cl. 265—59)

This case relates to weighing scales and particularly to the indicating means thereof.

The object of the invention is to provide a novel means for actuating an indicating device to indicate the load on the scale platform.

More specifically, the object is to provide means for actuating an indicator without direct connection of the indicator to the actuating means.

Still more specifically, the object is to operate an indicator by physically disconnected magnetic devices.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 3 is a view of a third form of the invention in which a rotary movement is imparted to the indicator.

Fig. 3a is a view on line 3a—3a of Fig. 3.

Figure 1:
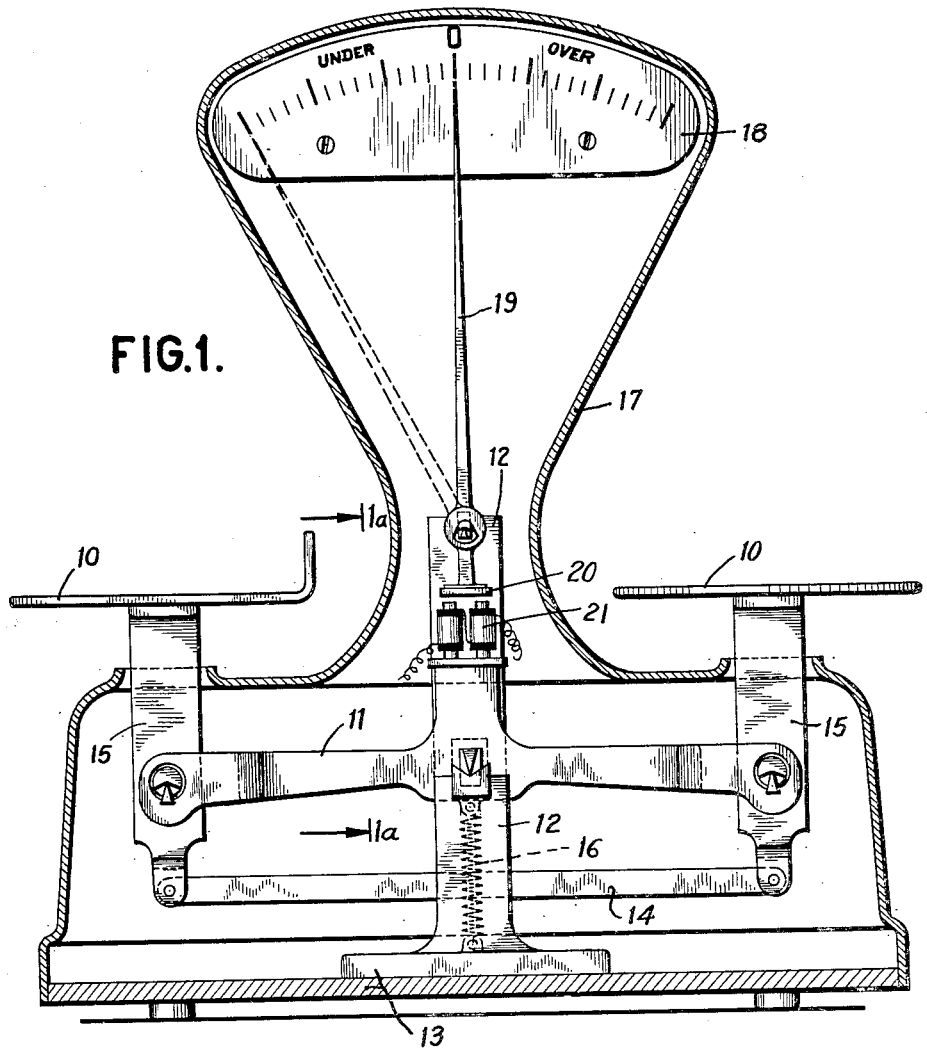
Fig. 1 is a view of one form of the invention applied to an even balance scale.
Figure 1A:
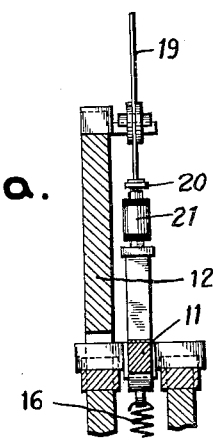
Fig. 1a is a section on line 1a—1a of Fig. 1.

Referring to Figs. 1 and 1a in detail, the even balance scale shown therein comprises pans 10 supported at opposite ends of an even balance beam 11 pivoted on an upright 12 carried by the base 13. A check lever 14 is connected to the stems 15 of the pans to restrain the latter for movement in a vertical direction. A counterbalancing spring 16 is connected to beam 11 at one end and at the other end is connected to the base 13. A housing 17 supported on the base 13 encloses the lower part of the scale and is fan-shaped at its upper end to carry a fan chart 18 having over and under indications for indicating the movement of the beam in either direction against the resistance of the counterbalancing spring. Moving over the face of the chart is a pointer indicator 19 pivoted on the upper end of one of the uprights 12. The lower end of the indicator 19 is provided with a magnetically sensitive portion 20 serving as the armature for a pair of electromagnetic coils 21. These coils are supported on the beam 11 directly above the fulcrum thereof. Movement of the beam and the electromagnets 21 in a counterclockwise direction as viewed in Fig. 1 through the attraction of the magnets exerted on armature 20 moves the latter in the same direction. This causes clockwise movement of pointer 19. Similarly, movement of the beam 11 clockwise swings the indicator 19 counterclockwise. In this manner without any physical connection between the beam and indicator an indication is provided of the over and under movement of the beam.

Figure 2:
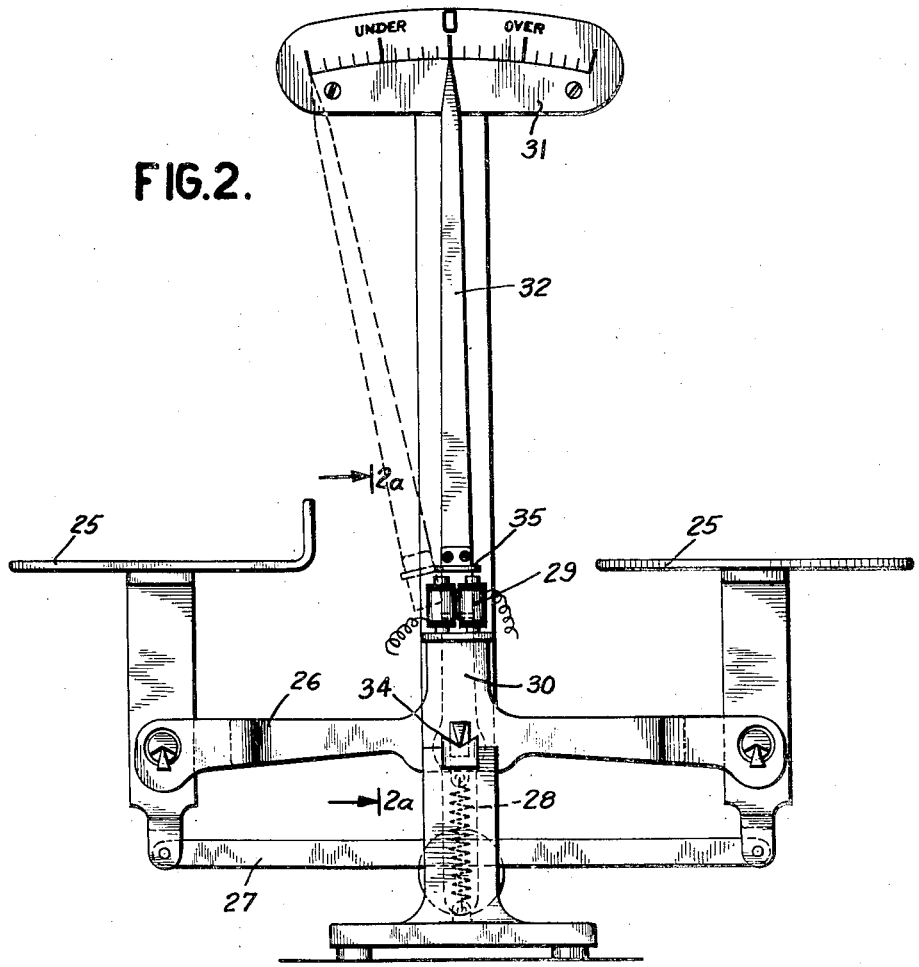
Fig. 2 is a view of another modification applied to an even balance scale in which the indicator is supported concentrically with the beam pivot.
Figure 2A:
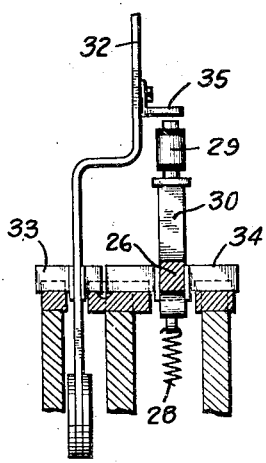
Fig. 2a is a section on line 2a—2a of Fig. 2.

Referring to Figs. 2 and 2a, a similar even balance construction is shown, pans 25 being carried by opposite ends of beam 26 and maintained for movement in a vertical direction by check lever 27. Counterbalancing spring 28 resists movement of the beam in either direction. As in a previous modification, electromagnets 29 are rigidly supported on an upstanding central portion 30 of the beam 26.

Chart 31 cooperates with a pointer 32 to indicate the movement of the beam. In this modification the pointer 32 is carried by a knife edge 33 alined with the fulcrum 34 of beam 26 as shown in Fig. 2a. The pointer carries a magnetically sensitive armature 35 directly above the electromagnets. When the latter swing in either direction they force the armature 35 to follow. Since the magnets and the armature swing about the same center they will always be the same distance from each other throughout their entire movement. Accordingly, the magnetic attraction between magnets 29 and armature 35 will be constant and weaker magnets may be used than in the previous modifications.

Fig. 3 shows a similar even balanced construction, pans 40 being carried by beam 41 and connected to check lever 42. Beam 41 is movable against the resistance of the counterbalancing spring 43. On a central upright 44 of the beam electromagnets 45 are mounted opposite a spool 46. The latter is fast to a shaft 47 rotatably supported on arms 48, 48' connected to a base 49. Fast to the shaft 47 is a graduated dial 50 for indicating movements of the beam under the loads. Arm 48' carries a pointer 51 for cooperation with the dial 50. Spool 46 has spirally wound thereon a thin magnetically sensitive strip 52 which coacts as an armature with the electromagnets 45. When the load on either pan is zero the electromagnets are midway between the ends of the spool. Upon movement of the beam and magnets thereon in either direction the strongest part of the field induced by the magnets approaches more closely to parts of the armature 52 which are to one side of the central portion of the spool. Thus if the magnets move to the left they will attract a portion of the armature filament located above it and in so doing rotate the spool towards the observer. When the magnets move to the right they similarly rotate the spool away from the observer. In this manner, movement of the beam rotates an indicator correspondingly.

Figure 4:
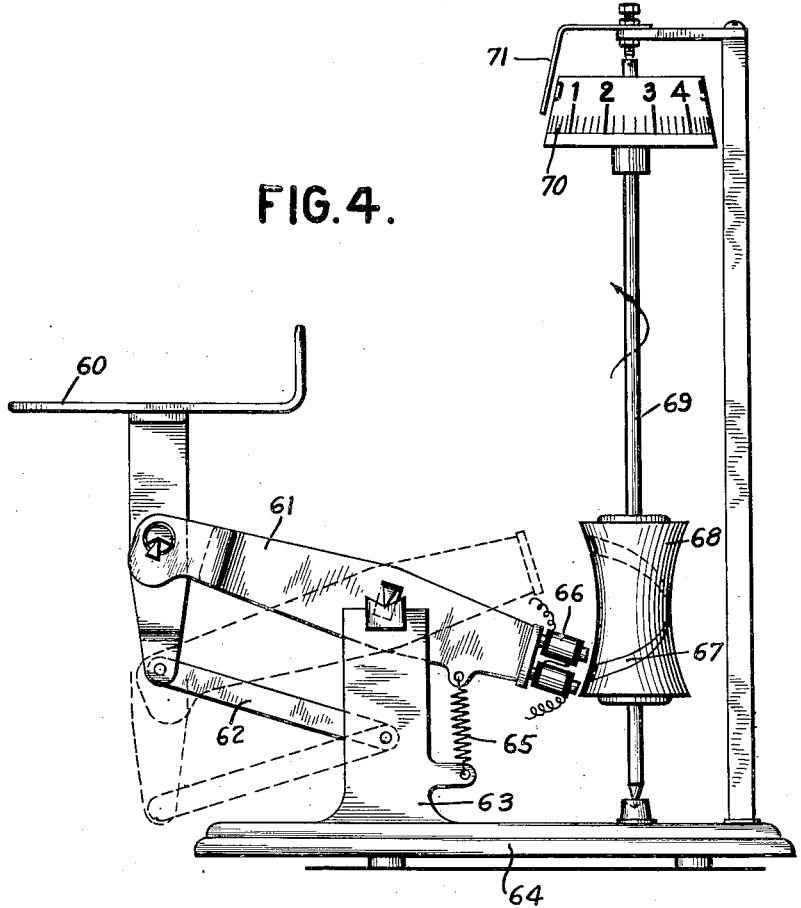
Fig. 4 is a view of the invention applied to an ordinary single pan scale.

Fig. 4 shows a pan 60 carried by one end of a beam 61 connected to a check rod 62 both pivoted to an upright 63 mounted on base 64. The beam 61 is movable against resistance of a coil spring 65 connected to the upright 63. The free end of the beam rigidly carries electromagnets 66 co-operating with a spiral strip armature 67 wound on a spool 68. The spool 68 is fast to a shaft 69 the upper end of which carries a drum chart 70 cooperating with a pointer 71. Movement of the beam 61 and the electromagnets thereon counter-clockwise causes the latter to attract portions of the armature strip 67 which they approach thereby rotating the spool 68 and the dial 70 thereon in the direction of the arrow to indicate the load on the platform.

The electromagnets in each of the above described modifications may have the current supplied thereto in any suitable manner.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A scale comprising a load support, a rockable weigh beam connected to the support and rocked thereby under the influence of the gravitational force of the load on the support, means operatively connected to the beam for counterbalancing the load on the support to hold the beam in an equilibrium position, a magnet mounted on and carried by the beam to rock therewith, a magnetically sensitive member within the magnetic field of said magnet, a pivotal mounting for said member on which the latter is automatically moved by the attractive force of said magnet to follow the magnet and thereby move in proportion to movement of the beam, and load registering means connected to said member to move therewith to register the equilibrium position of the beam.

2. A scale comprising a load support, a rockable weigh beam connected to the support and rocked thereby under the influence of the gravitational force of the load on the support, means operatively connected to the beam for counterbalancing the load on the support to hold the beam in an equilibrium position, a magnet mounted on and carried by said beam to rock therewith, a magnetically sensitive member within the magnetic field of said magnet, a pivot for said member coaxial with the rocking axis of said beam and on which the member is automatically rocked by the attractive force of said magnet to follow the magnet and thereby move in proportion to movement of the beam, and load indicating means connected to said member to move therewith and register the equilibrium position of the beam.

3. A scale comprising a load support, a rockable weigh beam connected to the support and rocked thereby under the influence of the gravitational force of the load on the support, means operatively connected to the beam for counterbalancing the load on the support to hold the beam in an equilibrium position, a magnet rigidly mounted on and carried by the beam to rock therewith and having a pole at a distance from the beam axis to provide a moment arm for the pole, a load registering element, a pivot therefor extending parallel to and at a distance from the axis of the beam, and a magnetically sensitive member carried by said element opposite said magnet pole and at a distance from the pivot of said element shorter than the distance of said magnet pole from the beam axis to provide a shorter moment arm for the member than the moment arm of said pole, said member being automatically moved by the attractive force of the magnet pole to follow the latter as the beam rocks and thereby cause the load registering element to rock about its pivot through an arc multiplied with respect to the arc of the beam movement about the beam axis in inverse proportion to the relative moment arms of said member and said magnet pole.

4. A scale comprising a load support, a rockable weigh beam connected to the support and rocked thereby under the influence of the gravitational force of the load on the support, means operatively connected to the beam for counterbalancing the load on the support to hold the beam in an equilibrium position, a magnet rigidly mounted on and carried by said beam to rock therewith, a member pivoted on an axis substantially at right angles to the axis of said beam and provided with a magnetically sensitive strip spirally wound about the axis of said member and within the magnetic field of the magnet to be automatically rotated by the attraction of the magnet as the latter rocks with said beam in a path adjacent and along the spiral strip, and load registering means connected to said member to rotate therewith for indicating the equilibrium position of the beam.

GEORGE R. WOOD.